June 25, 1963
W. D. COCKRELL
3,095,534
CIRCUIT FOR CONTROLLING ENERGIZATION
OF A DIRECT CURRENT LOAD
Filed Nov. 22, 1960
3 Sheets-Sheet 1
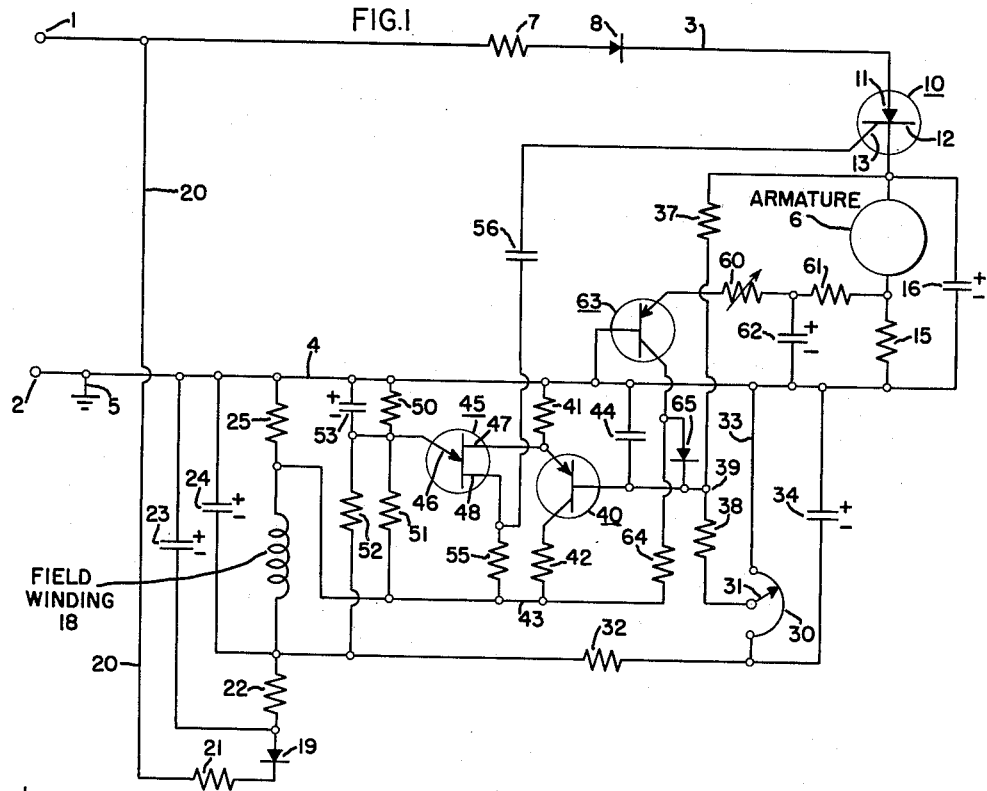
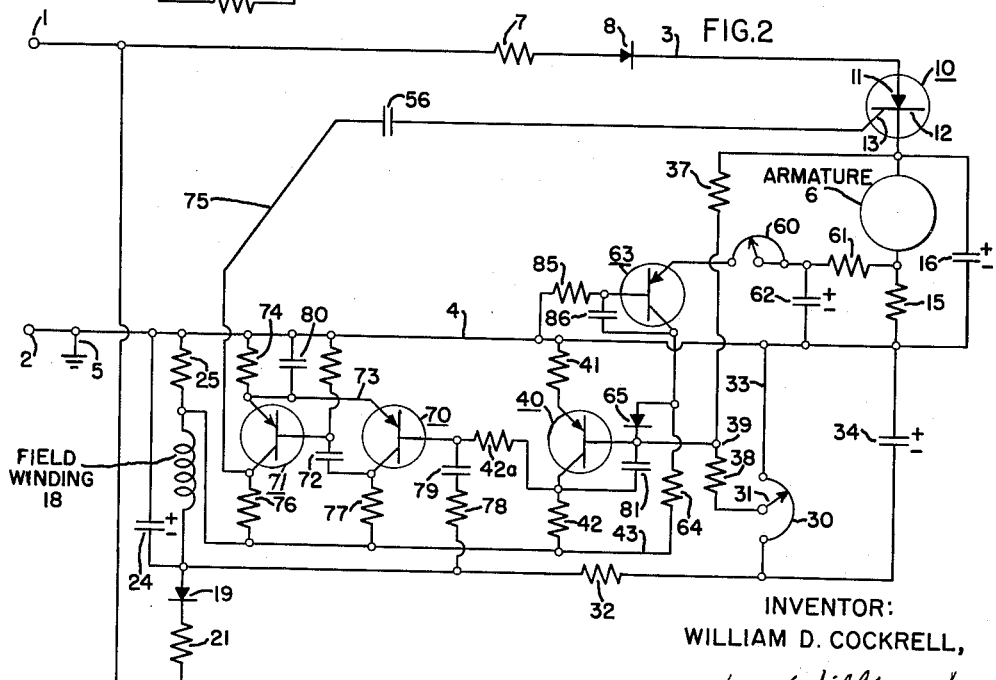
INVENTOR:
WILLIAM D. COCKRELL,
BY James J. Williams
HIS ATTORNEY.

INVENTOR:
WILLIAM D. COCKRELL
BY James J. Williams
HIS ATTORNEY.

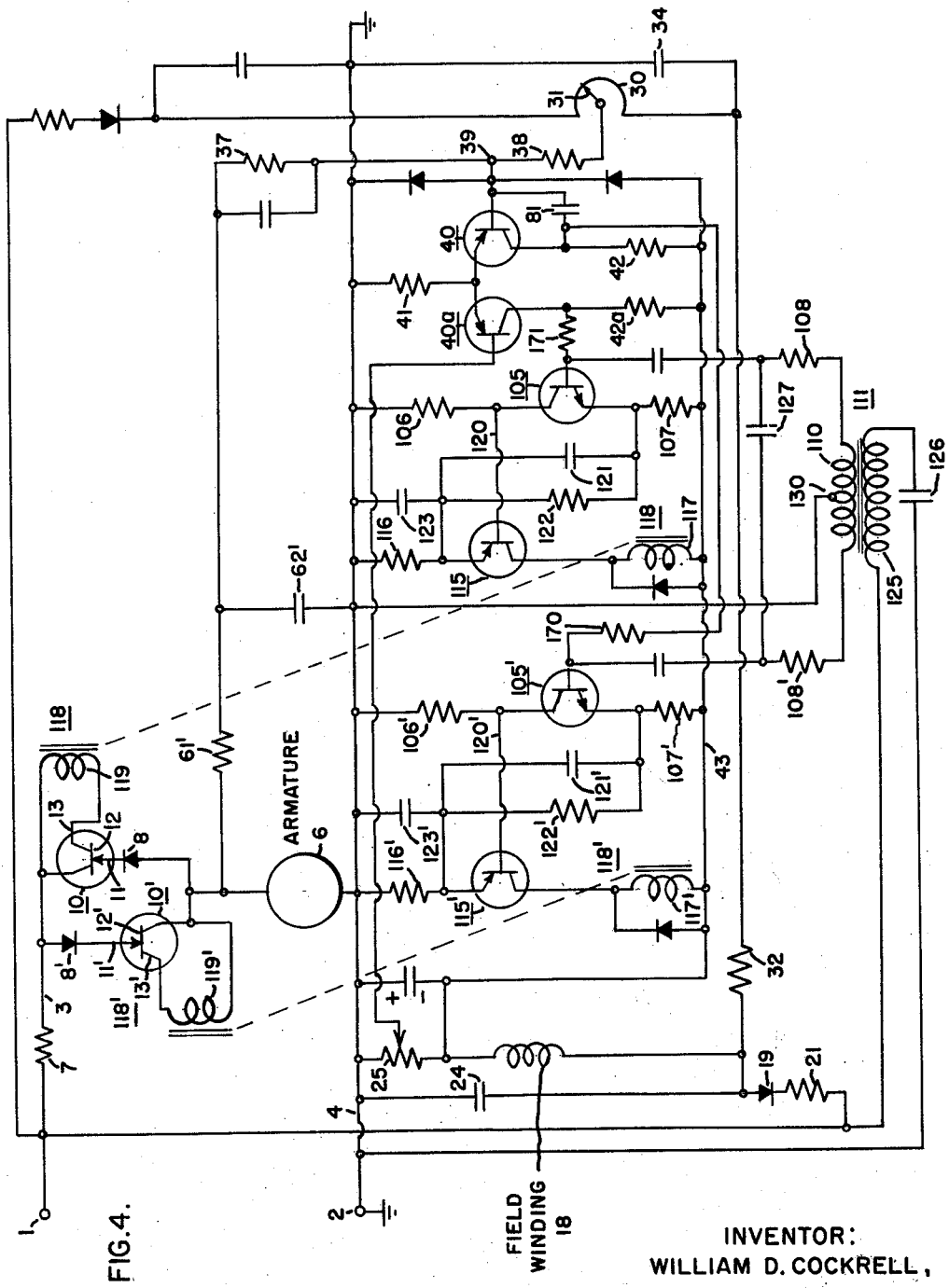

United States Patent Office 3,095,534
Patented June 25, 1963

3,095,534
CIRCUIT FOR CONTROLLING ENERGIZATION
OF A DIRECT CURRENT LOAD
William D. Cockrell, Waynesboro, Va., assignor to General Electric Company, a corporation of New York
Filed Nov. 22, 1960, Ser. No. 71,001
10 Claims. (Cl. 321—19)

This invention relates to a novel electrical control circuit using semiconductor controlled rectifiers in a closed loop control system.

It is an object of this invention to provide a novel electrical control circuit which is capable of controlling the energization of a direct current load, and which comprises only solid-state devices as the active elements.

It is another object of this invention to provide a novel electrical control circuit which uses only solid-state elements and which is arranged to maintain a characteristic of the load energized by the elements at a predetermined value.

It is another object of this invention to provide a novel circuit which controls the speed of electrical motors, regardless of the variation in load, and which uses controlled semiconductor rectifying devices for this purpose.

It is another object of this invention to provide a novel electrical control circuit which is capable of controlling the speed and direction of rotation of a motor and which uses controlled semiconductor rectifiers in order to control motors of appreciable size.

Briefly, the objects of this invention are achieved by circuit means for deriving a signal indicative of an instantaneous operating characteristic of the load and for comparing a signal so derived with a reference signal and using the difference therebetween to control the operation of a pulse generator or an oscillator or a trigger circuit. The output of this pulse circuit is utilized to determine the instant of conduction of a controlled semiconductor rectifier in series with the load to be energized and thereby control the energization of the load. This pulse circuit may take a number of forms, and the control circuit may be arranged for load energization in both directions, and may be operated with half-wave or full-wave rectification.

The subject matter which I regard as my invention is particularly pointed out and distinctly claimed in the concluding portion of this specification. My invention, however, both as to its organization and method of operation together with further objects and advantages thereof, may best be understood by reference to the following description taken in connection with the accompanying drawing in which:

FIGURE 1 is a schematic illustration of one embodiment of the invention;

FIGURE 2 is a schematic illustration of another embodiment of the invention;

FIGURE 4 is a schematic illustration of another embodiment of the invention providing for half-wave controlled energization of a load with unidirectional currents in either of two directions.

Figure 3:
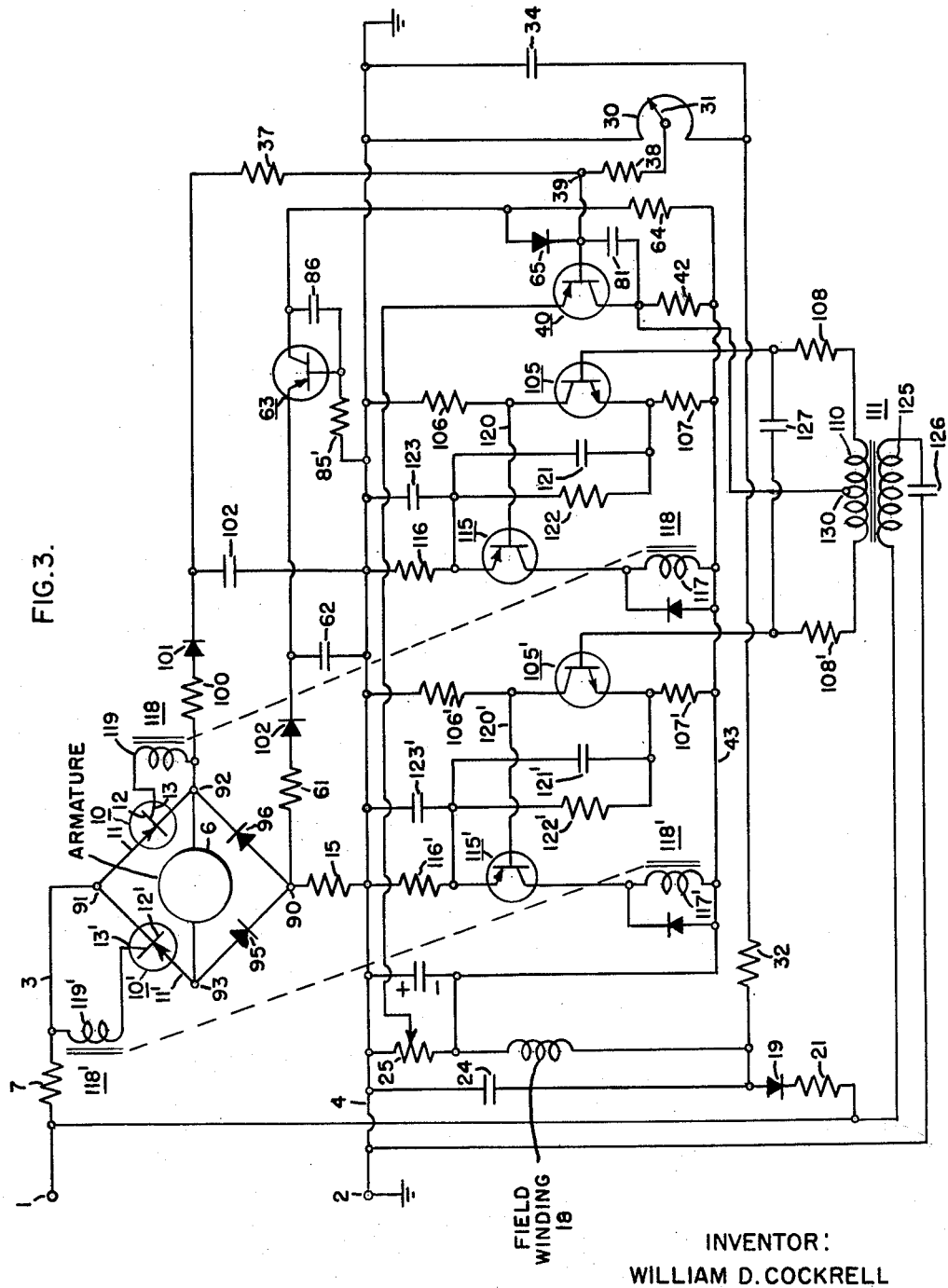
FIGURE 3 is a schematic illustration of another embodiment of the invention providing for full-wave controlled energization of a load with unidirectional currents in either of two directions.

Referring now to FIGURE 1 of the drawing, the embodiment illustrated is provided with supply terminals 1 and 2 which may be connected by any suitable means either directly or through a suitable supply transformer to an alternating current source. Main conductors or buses 3, 4 are connected to the terminals 1, 2 respectively and a suitable ground 5 or neutral may be coupled to the conductor 4 as shown schematically. The load to be controlled may take any desired form but in the illustrated embodiment it is constituted by a motor having an armature 6 connected in a series circuit with the conductors 3, 4 between the terminals 1, 2. Provided in the series circuit is a current limiting resistor 7 and a rectifier 8. Also provided in the series circuit is a semiconductor controlled rectifier 10 having an anode 11, a cathode 12 and a gate electrode 13. The rectifier 8 is provided to prevent excess inverse voltage from being applied to the controlled rectifier 10 and to permit a lower rated, less expensive device to be used in any given installation. The anode 11 of the controlled rectifier 10 is connected to the cathode of the rectifier 8 while the cathode 12 of the controlled rectifier 10 is connected to the armature 6 of the motor. A resistor 15 is connected between the other terminal of the armature 6 and the conductor 4 and a capacitor 16 is connected across the armature 6 to store energy during the conducting half cycle and thereby supply a higher average voltage to the armature 6.

The controlled rectifier 10 is of the type now well known in the art and usually consists of a plurality of P-N zones constructed in such a way that upon the application of a signal of the proper polarity and magnitude to the gate electrode 13, the controlled rectifier 10 will conduct when its anode 11 is positive with respect to its cathode 12. Thus, it may be seen that the direct current supplied to the armature 6 may be controlled by controlling the point when the controlled rectifier 10 conducts in the half cycle or cycles of the supply voltage during which the anode 11 is positive. The controlled rectifier 10 is cut off by the voltage reversal in the other half cycle when the anode 11 is negative with respect to the cathode 12.

The motor has, in addition to the armature 6, a field winding 18. In order that this field winding 18 may be energized, a rectifier 19 is conected in a series circuit across the conductors 3, 4 by means of a conductor 20. The rectifier 19 supplies half-wave direct current voltage to the field winding 18, and this voltage may be filtered by resistors 21, 22 and capacitors 23, 24. Also included in the series circuit is a voltage dropping resistor 25.

An adjustable reference voltage is provided by utilizing the direct current voltage supplied to the field winding 18 by the rectifier 19. This voltage is obtained across a potentiometer having a resistance element 30 and an adjustable slider 31. One side of the resistance element 30 is connected through a dropping resistor 32 to the junction of the resistor 22 with the field winding 18, while the other side is connected through a conductor 33 to the ground or neutral conductor 4. A capacitor 34 is provided in order to insure a uniform potential for the reference potentiometer. A voltage reference device such as a Zener diode may be connected in parallel with the capacitor 34. By suitable adjustment of the slider 31, a voltage may be derived from the resistance element 30 to function as a reference which is compared with a feedback signal. This feedback signal, to be compared with the adjustable reference, is derived from a voltage divider constituted by the resistors 37, 38 which are serially connected between the armature 6 and the slider 31.

Connected to the junction 39 of the resistors 37, 38 is the base of a P-N-P transistor 40, the emitter of which is connected through a resistor 41 to the neutral conductor 4 and the collector of which is connected through a resistor 42 to a conductor 43. The conductor 43 is connected to the junction of the field winding 18 and the resistor 25. Thus the conductor 43 provides a direct current voltage which is negative with respect to the ground conductor 4 and which is well filtered as a result of the inductance of the field winding 18. With a transistor 40 of the P-N-P type connected as illustrated, its conduction will increase as its base becomes more negative, and its conduction will decrease as its base becomes more positive. For any given setting of the slider 31, when the armature voltage is equal to and opposite in polarity to the slider voltage, the net voltage at the junction 39 will be zero and the conduction of the transistor 40 will be at some predetermined level. For this given setting of the slider 31, if the voltage across the armature 6 increases, conduction of the transistor 40 will decrease, but if the voltage across the armature 6 decreases, conduction of the transistor 40 will increase. If the load is constituted by a motor as illustrated, the magnitude of the feedback signal will be determined by the motor speed and the degree of conduction of the transistor 40 will consequently be determined by whether or not this signal is positive or negative with respect to the voltage fixed by the setting of the slider 31 and the degree to which it is positive or negative.

The output of the transistor 40 is supplied to control the operation of a pulse generator in the form of a unijunction oscillator which in turn supplies an output pulse of the proper polarity and amplitude to cause the controlled rectifier 10 to conduct at the appropriate and desired point in each half cycle of supply. In the embodiment of FIGURE 1, the pulse generator comprises a unijunction transistor 45 having an emitter electrode 46 and a pair of base electrodes 47, 48. The emitter 46 is connected to a junction on a voltage divider constituted by two resistors 50, 51 connected between the conductor 43 and the neutral conductor 4. A resistor 52 is connected at one end to the same junction and at its other end to the junction of the field winding 18 and the resistor 22. A capacitor 53 is connected to the junction of the resistors 50, 51 and to the conductor 4. A connection is provided from the upper base 47 of the unijunction transistor 45 to the emitter of the transistor 40 while the lower base 48 of the unijunction transistor 45 is connected through a resistor 55 to the conductor 43 and through a coupling impedance, which in FIGURE 1 is constituted by a capacitor 56, to the gate electrode 13 of the controlled rectifier 10.

One thing should be pointed out in connection with the circuit just described. The voltage (provided by the resistors 50, 52 connected between the ground conductor 4 and the lower end of the field winding 18) on the emitter 46 of the unijunction transistor 45 is modulated or varied a small amount by a substantially saw-tooth voltage which results from the charge and discharge of the capacitor 24 by the supply voltage. This modulated voltage serves to turn on the unijunction transistor 45 (i.e., provide a low impedance path between the emitter 46 and the lower base 48) at a time dependent upon the value of the modulated voltage and upon the potential of the upper base 47.

The operation of the pulse generator portion of the circuit and the effect of the conduction of the transistor 40 may now be described. It may be seen from an inspection of the drawing that the upper base 47 of the transistor 45 is positive with respect to the lower base 48. The potential of the upper base 47 is determined by the voltage drop across the resistor 41, this voltage drop depending upon the current flow through the transistor 40. If, for example, the potential on this upper base 47 is made more negative (as in the case of increased current flow through the transistor 40 resulting from decreased armature voltage), the modulated emitter potential becomes effective sooner to permit the transistor 45 to conduct to provide a low impedance path between the emitter 46 and the lower base 48. When this occurs, the capacitor 53 will discharge through this low impedance path and the resistor 55 to the conductor 43 to produce a positive pulse relatively sooner. This pulse is coupled through the capacitor 56 to the gate electrode 13 of the controlled rectifier 10. The circuit parameters are selected so that the positive pulse so transmitted is of an amplitude sufficient to cause the controlled rectifier 10 to conduct during that portion of a half cycle of voltage when its anode 11 is positive with respect to its cathode 12 and supply current to the armature 6 as determined by the point in the half cycle when this positive pulse is coupled through the capacitor 56. If the potential on the upper base 47 is made more positive (as in the case of decreased current flow through the transistor 40 resulting from increased armature voltage), the emitter potential of the unijunction transistor 45 becomes effective later to provide the pulse to the gate electrode 13 of the controlled rectifier 10.

By virtue of this arrangement, the speed of the motor can be held to a predetermined value. Thus, the voltage supplied to the load or armature 6 is compared to the voltage selected by the slider 31 and the difference used to determine the conduction of the transistor 40. The conduction of the transistor 40 accordingly supplies a direct current voltage, the magnitude of which is a function of the difference voltage, and this direct current voltage together with the phase shifted pulsating voltage supplied to the emitter 46 of the unijunction transistor 45 determines the point in time during the half cycle at which this unijunction transistor 45 conducts and provides a pulse effective to cause the controlled rectifier 10 to conduct.

When the control circuit is used in connection with a motor control as shown, it may be desirable to provide a current limit circuit in order to prevent excessive current during periods of acceleration from damaging the motor by overheating. This may be provided by determining the voltage drop across the armature resistor 15 and filtering it by the resistors 60, 61 and the capacitor 62 to control the conduction of a transistor 63. The transistor 63 is of the P-N-P variety connected in a grounded base configuration and with its emitter connected to the resistor 60 of the filter circuit. The collector is connected through a resistor 64 to the conductor 43. A rectifier 65 is connected between the base of the transistor 40 and the collector of the transistor 63, and is poled to conduct when the collector of the transistor 63 is positive with respect to the conductor 43. This circuit insures that as the armature current increases, as sensed by the voltage drop across the resistor 15, the conduction of the transistor 63 will also increase and the voltage drop across the resistor 64 will correspondingly increase. Under these circumstances the base of the transistor 40 will become more positive thus decreasing the conduction through the transistor 40. Thus, this circuit, in effect, takes over and limits the conduction of the transistor 40 regardless of the magnitude of the difference derived by comparing the armature voltage with the voltage derived by the slider 31 from the reference potentiometer.

FIGURE 2 of the drawing illustrates another embodiment of the invention in which a pulse generator of a different type is provided. The elements in this embodiment which correspond to the elements described in connection with FIGURE 1 have been given the same reference numerals. In this embodiment of the invention, the pulse generator is constituted by a pair of P-N-P transistors 70, 71 coupled as a monostable multivibrator. The transistors are arranged and coupled so that when the multivibrator is in its stable state, the transistor 70 is normally conducting as a result of the voltage applied to its base through two resistors 42, 42a which couple the base of the transistor 70 to the bus 43. Switching of the transistors is provided through a capacitor 72 coupled between the collector of the transistor 70 and the base of the transistor 71. Rapid transition or switching to the unstable state is provided by the lead 73 which couples the two emitters of the transistors 70, 71 together. The modulated voltage wave present at the junction of the rectifier 19 and the field winding 18 is coupled to the base of the transistor 70 through a resistor 78 and a capacitor 79. As this modulated voltage increases in a positive direction, a point will be reached at which the transistor 70 will be cut off. When the transistor 70 is cut off, its collector becomes relatively negative, and this negative voltage is coupled through the capacitor 72 to the base of the transistor 71 thus turning the transistor 71 on rapidly. The emitter voltage of the transistor 71 becomes more negative because of the relatively large emitter current through the resistor 74 resulting from the fact that the magnitude of the resistor 76 is relatively small compared to the magnitude of the resistor 77. This more negative voltage tends to cut the transistor 70 rapidly off. Current flow between the emitter-collector circuit of the transistor 71 causes the upper end of the resistor 76 to become positive rapidly to supply a pulse of current through a lead 75 and the capacitor 56 to the gate electrode 13 of the controlled rectifier 10 to turn the controlled rectifier 10 on. A capacitor 80 is provided to supply extra energy for the pulse output supplied to the capacitor 56. Once the capacitor 72 becomes charged, and once the modulated voltage present at the junction of the rectifier 19 and the field winding 18 falls to a predetermined level, the transistor 70 again turns on and the transistor 71 is cut off. As in the case of FIGURE 1, the time occurrence of the switching action of the transistors 70, 71 is determined by the conduction of the transistor 40 and the voltage at its collector, which in turn depends upon the relative magnitude of the armature voltage and the reference voltage. If desired, the transistor 63 may be provided with a dropping resistor 85 connected between its base and the conductor 4. Also, capacitors 86, 87 may be connected between the collectors and bases of the transistors 63, 40 respectively in order to provide for more stable operation of these elements as is well known in the feedback control art.

In many situations it is desirable to provide controls of the type shown for motors or other loads which are somewhat greater in size than those which can be energized by half-wave circuits of the type illustrated in FIGURES 1 and 2. Accordingly, FIGURE 3 discloses an embodiment of the invention in which a motor is provided with a full-wave rectifying circuit controlled in accordance with the principles of the invention. In this figure, the elements which correspond to the elements in FIGURES 1 and 2 have been given the same reference numerals. The power circuit for energizing the motor armature 6 comprises a rectifying bridge having input terminals 90, 91 which are connected to the conductors 3, 4 for connection to the supply terminals 1, 2. The bridge is also provided with output terminals 92, 93 across which the armature 6 of the motor is connected. Connected between the terminals 91, 92 is the controlled rectifier 10 while a similar controlled rectifier 10' is connected between the terminals 91, 93. The other two arms of the bridge are constituted by diode rectifiers 95, 96. It may be seen from an inspection of the drawing that all of the rectifying elements in the bridge are connected so that current flow through the motor armature 6 is in one direction only. Thus, when the terminal 91 is positive with respect to the terminal 90 and the controlled rectifier 10 has been turned on by the application of a suitable control voltage to its gate electrode 13, current flow will exist from the terminal 91 through the controlled rectifier 10, the motor armature 6, the terminal 93, and thence through the diode rectifier 95 to the terminal 90. On the succeeding half cycle when the terminal 90 is positive with respect to the terminal 91, current will flow from the terminal 90 through the diode rectifier 96, the terminal 92, the motor armature 6 in the same direction, the terminal 93 and thence through the controlled rectifier 10' to the terminal 91. Thus, a means is provided for energizing the motor armature 6 with voltage in the same direction during both half cycles of the alternating current supplied to the terminals 1, 2.

The feedback voltage from the motor armature 6 is obtained through a dropping resistor 100 and a diode rectifier 101 and may be filtered by a capacitor 102 and supplied to the comparison circuit consisting of the resistors 37, 38. In this circuit, current limit and takeover by action of the current limit circuit is provided as with FIGURES 1 and 2 above by sensing the voltage across the armature resistor 15, and filtering the voltage by the resistor 61 and the capacitor 62. The diode rectifier 102 is provided so as to insure unidirectional current in the current limit circuit of the control.

In order that the controlled rectifiers 10, 10' may be fired on respective half cycles of the alternating current supply, the embodiment shown in FIGURE 3 contemplates a pulse generator in the form of a pair of trigger circuits which are arranged to provide a firing pulse to the respective control electrodes 13, 13' on alternate half cycles at the appropriate point in order that the motor armature 6 may be supplied with current as determined by the setting of the potentiometer slider 31. Since these trigger circuits are similar to each other, they have been given the same reference numerals and the action of only one of them will be described in detail. The circuit for providing a firing pulse for the controlled rectifier 10 is constituted by a normally cut off transistor 105 which has its collector connected through a resistance 106 to the conductor 4, its emitter connected through a resistor 107 to the conductor 43, and its base connected through a resistor 108 to one side of the secondary winding 110 of a transformer 111. The trigger circuit also includes a normally cut off transistor 115 which has its emitter connected through a resistor 116 to the conductor 4, and its collector connected to supply the primary winding 117 of a transformer 118. A secondary winding 119 of the transformer 118 is connected between the gate electrode 13 and the cathode 12 of the controlled rectifier 10. A first connection 120 is provided between the collector of the transistor 105 and the base of the transistor 115 while a second connection is provided through a capacitor 121 and a resistor 122 between the emitter of the transistor 115 and the emitter of the transistor 105. In order that a sharp pulse may be provided during the operation of the trigger circuit, a capacitor 123 is connected between the emitter of the transistor 115 and the conductor 4.

In order that the point in time (with respect to the half cycle of alternating current supply) when the controlled rectifiers 10, 10' are caused to conduct may be precisely controlled, the trigger circuits are controlled by the combination of two signals. These signals include a direct current signal determined by the level of conduction of the transistor 40 and a phase shifted alternating current signal supplied through the transformer 111. This transformer 111 is provided with a primary winding 125 that is connected across the conductors 3, 4 through a capacitor 126 connected in series therewith. Connected in parallel with the secondary winding 110 of the transformer 111 is a capacitor 127 for the purpose of suppressing any transients which may occur. Because of the capacitor 126, the voltage on the secondary winding 110 of the transformer 111 is shifted in phase approximately 90 degrees with respect to the alternating current supply voltage. Connected to a center tap 130 on the secondary winding 110 is the collector of the transistor 40. Thus, the signals supplied to the transistors 105, 105' respectively consist of a phase shifted alternating current signal and a direct current voltage whose magnitude is a function of the conduction of the transistor 40.

If the trigger circuit constituting the transistors 105, 115 is considered, the combination of the direct voltage appearing as a result of the conduction of the transistor 40 and the postive portion of the alternating current voltage will, when applied to the base of the transistor 105 cause the transistor 105 to be turned on. The time at which the transistor 105 is turned on depends upon the magnitude of the direct voltage provided across the resistor 42 by conduction of the transistor 40. This voltage is coupled through the center tap 130, a portion of the secondary winding 110, and the resistor 108 to the base of the transistor 105. When the transistor 105 is turned on, its emitter rises in voltage and this rise, when coupled through the capacitor 121 to the emitter of the transistor 115, causes the transistor 115 to be turned on. The voltage drop through the resistor 106 resulting from current flow through the transistor 105 will tend to lower the collector voltage of the transistor 105 and to lower the base voltage of the transistor 115 thus turning the transistor 115 on more quickly. The sudden turn-on of the transistor 115 produces a pulse in the primary winding 117 of the transformer 118. Energy for this pulse is supplied by the capacitor 123. The pulse causes the controlled rectifier 10 to conduct and thus supply current to the motor armature 6. On the next half cycle, when the positive phase shifted alternating current is supplied to the base of the transistor 105′ through the transformer 111, this transistor 105′ and the transistor 115′ will conduct and a corresponding pulse be supplied to the gate electrode 13′ of the controlled rectifier 10′ so that the selected portion of the opposite half cycle of the alternating current supply will be supplied to the motor armature 6.

As before, the point in the half cycle at which the controlled rectifiers 10, 10′ conduct is determined by the speed of the motor and the resulting armature voltage when compared to the voltage derived by the setting of the slider 31. During the times in the half cycles when the bases of the transistors 105, 105′ are negative, these transistors are turned off. When the transistors 105, 105′ are turned off, their respective collector electrodes become sufficiently positive to cause the base electrodes of the transistors 115, 115′ to become positive and cut off the transistors 115, 115′. During this time when the transistors 115, 115′ are cut off, the capacitors 123, 123′ have an opportunity to become charged and provide sufficient power to energize the respective windings 117, 117′ when the respective transistors are turned on.

In certain applications, it is desirable to be able to provide energization of a load, such as a motor armature, in either of two directions. In other words, in the case of a motor, it is desirable that the motor be capable of being driven in both directions. Accordingly, FIGURE 4 discloses an embodiment of the invention in which a motor is provided with circuitry in accordance with the invention which is capable of driving the motor armature 6 in either direction. In FIGURE 4, the elements corresponding to elements in the previous figures have been given the same reference numerals.

In FIGURE 4, the power circuit for energizing the motor armature 6 comprises the controlled rectifiers 10, 10′ connected in series with the armature 6 between the conductors 3, 4 in opposite directions. Thus, current through the controlled rectifier 10 energizes the armature 6 in one direction, while current through the controlled rectifier 10′ causes energization of the armature 6 in the opposite direction. Actually, in a practical embodiment of FIGURE 4, both controlled rectifiers might be conducting (but for different lengths of time) during respective half cycles. The controlled rectifiers 10 is turned on through a transformer secondary winding 119 of the transformer 118, the secondary winding 119 being coupled between the gate electrode 13 and the cathode 12 of the controlled rectifier 10. Since similar circuitry and operation is provided for the other direction of operation of the armature 6 and its energization, only a portion of the operation will be described and explained. The secondary winding 119 of the transformer 118 receives a pulse from the primary winding 117 coupled to the secondary winding 119. This pulse is provided in the same manner by the transistors 105, 115 as described in connection with FIGURE 3. Thus, the transistors 105, 115 are normally cut off, and are rendered conducting at a point in time determined by the alternating current signal on the secondary winding 110 of the transformer 111 in combination with the voltage on the collector of the transistor 40a. The combined signal is applied to the base of the transistor 105. The transistor 40a is coupled with the transistor 40 to provide signals at the collector electrodes respectively which are opposite in characteristic or which vary in opposite directions. Thus, a signal applied to the base of the transistor 40 from the voltage divider resistors 37, 38 which tends to render the transistor 40 more conductive and hence raise its collector voltage also tends to reduce conduction through the transistor 40a and lower its collector voltage. Conversely, a signal applied to the base of the transistor 40 which decreases conduction through the transistor 40 and lowers its collector voltage also tends to increase conduction thorugh the transistor 40a and raise its collector voltage. The voltage on the collector of the transistor 40 is coupled through a resistor 170 to the base of the transistor 105′, and the voltage on the collector electrode of the transistor 40a is coupled through a resistor 171 to the base of the transistor 105.

If the slider 31 on the potentiometer resistor 30 is set at mid-point, the potential at the junction 39 is of such magnitude, preferably near zero, to cause both transistors 40, 40a to conduct equally. Thus, transistors 105, 115 and transistors 105′, 115 fire at comparable times in appropriate half cycles so that equal signals are applied through the primary windings 117, 117′ of the transformers 118, 118′. Thus, the controlled rectifiers 10, 10′ are rendered conductive equal amounts so that the motor armature 6 tends to remain stationary. Any variation in voltage at the junction 39 resulting from a variation or difference between the voltage on the slider 31 and the voltage on the armature 6 results in the armature being rotated in either one direction or the other. This rotation, and its speed, can be controlled by appropriately moving the slider 31 upward or downward.

As will be appreciated by persons skilled in the art, the control circuit in accordance with the invention may be used in a number of different applications, such as loads other than a motor armature. Further, features shown in the figures may be combined in various ways as will be apparent to persons skilled in the art. For example, the full-wave rectifier operation of FIGURE 3 may be used in the other figures. Likewise, the unijunction oscillator of FIGURE 1 may be used in the other figures, or the multivibrator of FIGURE 2 may be used in the other figures. But regardless of the manner in which the invention is used, it is to be understood that modifications may be made by persons skilled in the art without departing from the spirit of the invention or from the scope of the claims.

What I claim as new and desire to secure by Letters Patent of the United States is:

1. A circuit for controlling the direct current energization of an electrical load from an alternating current source comprising a controlled semiconductor rectifier having a gate electrode, said rectifier being adapted to be connected between said source and said load, first means adapted to be coupled to said load for deriving a unidirectional control signal indicative of the operation of said load, control means responsive to said control signal and operative to produce an output signal commensurate with the deviation of said control signal from a predetermined condition second means adapted to be coupled to said source for producing a varying signal, firing means coupled to said second means and to said control means for combining said output signal and said varying signal to produce a firing pulse at a time determined by the characteristic of said output signal, and means coupling said firing means to said gate electrode to cause said rectifier to conduct in response to said pulse.

2. A circuit for controlling the direct current energization of an electrical load from an alternating current source comprising a controlled semiconductor rectifier having a gate electrode, means coupling said rectifier in a series circuit with said load, said series circuit being adapted to be coupled to said source, first means coupled to said load for producing a voltage indicative of the operation of said load, control means responsive to said operation voltage and operative to produce a control voltage having a magnitude discretely representative of the deviation of said operation voltage from a predetermined value a pulse generator circuit having input terminals for applying input signals thereto and an output circuit for producing firing pulses in response to and at a time said input signals exceed a predetermined level, means coupling said control means to one of said input terminals for applying said control voltage thereto, second means for producing a variable signal in response to said source, means coupling said second means to one of said input terminals for applying said variable signal thereto, and means coupling said output circuit to said gate electrode for applying said firing pulses to said gate electrode and rendering said controlled rectifier conductive.

3. A circuit for controlling the direct current energization of an electrical load from an alternating current source comprising a controlled semiconductor rectifier having a gate electrode, means coupling said controlled rectifier in a series circuit with said load, means coupling said series circuit to said source, first means coupled to said load for producing a direct current voltage indicative of the operation of said load, second means for producing a direct current reference voltage, a combining circuit coupled to said first means and to said second means for producing a combined output signal having a magnitude indicative of the relative values of said direct current operation voltage and said direct current reference voltage, a pulse generating circuit having input terminals for applying input signals thereto and an output circuit for producing firing pulses in response to and at a time said input signals exceed a predetermined level, third means coupled to said source for producing variable and recurring signals, means coupling said combining circuit to one of said input terminals for applying said combined signal thereto, means coupling said third means to one of said input terminals for applying said variable and recurring signals thereto, and means coupling said output circuit to said gate electrode for applying said firing pulses to said gate electrode and rendering said controlled rectifier conductive.

4. The invention defined in claim 3 wherein said pulse generating circuit comprises a unijunction transistor having a first base electrode, a second base electrode, and an emitter electrode, said first base electrode providing said one terminal for said combined signal, said emitter electrode providing said one terminal for said variable and recurring signals, and said second base electrode providing said output circuit.

5. The invention defined in claim 3 wherein said pulse generating circuit comprises a monostable multivibrator having first and second transistors regeneratively coupled by a timing circuit and by a direct current circuit, the base electrode of the normally conducting transistor providing said one terminal for said combined signal and further providing said one terminal for said variable and recurring signals, and the emitter-collector circuit of the normally nonconducting transistor providing said output circuit.

6. A circuit for controlling the direct current energization of an electrical load from an alternating current source comprising first and second controlled semiconductor rectifiers each having a gate electrode, means coupling said rectifiers in series with said load, said rectifiers being arranged to be coupled to said source so that one of said rectifiers supplies current to said load in response to one polarity of voltage of said source and so that the other of said rectifiers supplies current to said load in response to the other polarity of voltage of said source, first means coupled to said load for producing a voltage indicative of the operation of said load, first and second pulse generating circuits each having input terminals for applying input signals thereto and each having an output circuit for producing firing pulses in response to and at a time said input signals exceed a predetermined level, means for producing a reference signal, a combining circuit coupled to said first means and to said reference signal means for producing a combined output signal having a magnitude indicative of the relative values of said operation voltage and said reference signal, means for applying said combined output signal to one of said input terminals of each of said pulse generating circuits, second means for producing variable signals in response to said source, means coupling said second means to one of said input terminals of each of said pulse generating circuits for applying said variable signals thereto, means coupling said output circuit of said first pulse generating circuit to said gate electrode of said first controlled rectifier, and means coupling said output circuit of said second pulse generating circuit to said gate electrode of said second controlled rectifier, said last two means providing means for applying firing pulses to respective gate electrodes and rendering said controlled rectifiers respectively conductive.

7. A circuit for controlling the direct current energization of an electrical load from an alternating current source comprising a controlled rectifier connected between said load and said source and operative in response to a pulse to assume a low impedance state, monitoring means responsive to the operation of said load for producing signals representative thereof, means controlled by said monitoring means and operative in response to said signals to produce a control signal discretely indicative of the magnitude of deviation of said operation from a predetermined condition, means connected to said source for producing a periodic signal, and control means connected to said controlled rectifier and responsive to said control signal and said periodic signal to selectively produce pulses for switching said controlled rectifier to a low impedance state.

8. A circuit for controlling the direct current energization of an electrical load in either of two directions from an alternating current source comprising first and second controlled semiconductor rectifiers each having a gate electrode, means coupling said rectifiers in series with said load, the first of said rectifiers being poled to permit current to flow through said load in one direction and the second of said rectifiers being poled to permit current to flow through said load in the opposite direction, said rectifiers and said load being adapted to be coupled to said source, first means coupled to said load for producing first and second voltages which have opposite characteristics and which are indicative of the operation of said load, first and second pulse generating circuits each having input terminals for applying input signals thereto and each having an output circuit for producing firing pulses in response to and at a time said input signals exceed a predetermined level, means coupling said first means to one of said input terminals of said first pulse generating circuit for applying said first operation voltage thereto, means coupling said first means to one of said input terminals of said second pulse generating circuit for applying said second operation voltage thereto, second means for producing variable signals in response to said source, means coupling said second means to one of said input terminals of each of said pulse generating circuits for applying said variable signals thereto, and means respectively coupling said output circuits of said first and second pulse generating circuits to said gate electrodes of said first and said second controlled rectifiers for applying said firing pulses thereto and rendering said first and said second controlled rectifiers respectively conductive.

9. A circuit as defined by claim 1 wherein said firing means comprises a unijunction transistor.

10. A circuit for controlling the direct current energization of an electrical load from an alternating current source comprising a controlled semiconductor rectifier having a gate electrode, said rectifier being adapted to be connected between said source and said load, first means adapted to be coupled to said load for deriving a unidirectional control signal indicative of the operation of said load, control means responsive to said control signal and operative to produce an output signal commensurate with the deviation of said control signal from a predetermined condition, second means adapted to be coupled to said source for producing a varying signal, a unijunction transistor having an emitter electrode connected to said second means and a base electrode connected to said control means for combining said output signal and said varying signal to produce a firing pulse at a time determined by the characteristic of said output signal, and means coupling said unijunction transistor to said gate electrode to cause said rectifier to conduct in response to said pulse.

References Cited in the file of this patent

UNITED STATES PATENTS

| | | |
|---|---|---|
| 2,630,557 | Bixby | Mar. 3, 1953 |
| 2,694,172 | Trousdale | Nov. 9, 1954 |
| 2,939,064 | Mombert et al. | May 31, 1960 |
| 2,977,523 | Cockrell | Mar. 28, 1961 |
| 2,998,547 | Berman | Aug. 29, 1961 |